United States Patent
Gardiner et al.

(10) Patent No.: US 7,460,170 B2
(45) Date of Patent: Dec. 2, 2008

(54) COMPUTER EXPANSION MODULE HAVING IMAGE CAPTURE AND DECODING FUNCTIONALITY

(75) Inventors: Robert C. Gardiner, Fayetteville, NY (US); James Crill, Skaneateles, NY (US); Colleen Gannon, Jordan, NY (US); James Montoro, Fairport, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 795 days.

(21) Appl. No.: 10/252,481

(22) Filed: Sep. 23, 2002

(65) Prior Publication Data

US 2004/0056956 A1    Mar. 25, 2004

(51) Int. Cl.
*H04N 5/225* (2006.01)
*G06K 7/10* (2006.01)

(52) U.S. Cl. ............. 348/372; 348/207.1; 235/462.11
(58) Field of Classification Search ............. 348/207.1, 348/91, 372; 235/462.11, 462.24, 462.41, 235/462.42, 462.3, 462.1, 462.2, 462.32
See application file for complete search history.

(56) References Cited

U.S. PATENT DOCUMENTS

| | | | | |
|---|---|---|---|---|
| 5,796,088 A * | 8/1998 | Wall | ...................... | 235/472.01 |
| 5,808,672 A * | 9/1998 | Wakabayashi et al. | ... | 348/220.1 |
| 5,979,764 A * | 11/1999 | Swyst et al. | ............. | 235/462.2 |
| 6,019,286 A * | 2/2000 | Li et al. | ...................... | 235/454 |
| 6,108,727 A * | 8/2000 | Boals et al. | .................... | 710/68 |
| 6,118,485 A * | 9/2000 | Hinoue et al. | ............... | 348/373 |
| 6,177,950 B1 * | 1/2001 | Robb | ...................... | 348/14.01 |
| 6,292,272 B1 * | 9/2001 | Okauchi et al. | ............. | 358/471 |
| 6,536,670 B1 * | 3/2003 | Postman et al. | ............. | 235/487 |
| 6,580,460 B1 * | 6/2003 | Takahashi et al. | ........... | 348/372 |
| 6,670,985 B2 * | 12/2003 | Karube et al. | ............ | 348/207.1 |
| 6,722,569 B2 * | 4/2004 | Ehrhart et al. | ............... | 235/469 |
| 6,726,094 B1 * | 4/2004 | Rantze et al. | ............... | 235/379 |
| 6,873,356 B1 * | 3/2005 | Kanbe et al. | ............. | 348/207.1 |
| 6,950,128 B1 * | 9/2005 | Sawada | .................... | 348/231.3 |
| 2002/0013161 A1 * | 1/2002 | Schaeffer et al. | ............ | 455/557 |
| 2003/0016292 A1 * | 1/2003 | Lee et al. | .................. | 348/222.1 |

* cited by examiner

*Primary Examiner*—Lin Ye
*Assistant Examiner*—Kelly Jerabek
(74) *Attorney, Agent, or Firm*—Marjama Muldoon Blasiak & Sullivan LLP

(57) ABSTRACT

A computer assembly having a host computer and a detachably attached computer expansion module. The computer expansion module includes a 2D imaging module, and may include short range imaging optics. In a "picture taking" mode actuated by input into the host computer, the expansion module captures an image, and without launching a decoding algorithm, sends the captured image to the host computer which displays the image on an integrated display of the host computer. In a "decode" mode actuated by input to the host computer, the expansion module captures an image, executes a decoding algorithm, and sends a decoded out message to the host computer, which displays the decoded out message on an integrated display of the host computer.

18 Claims, 12 Drawing Sheets

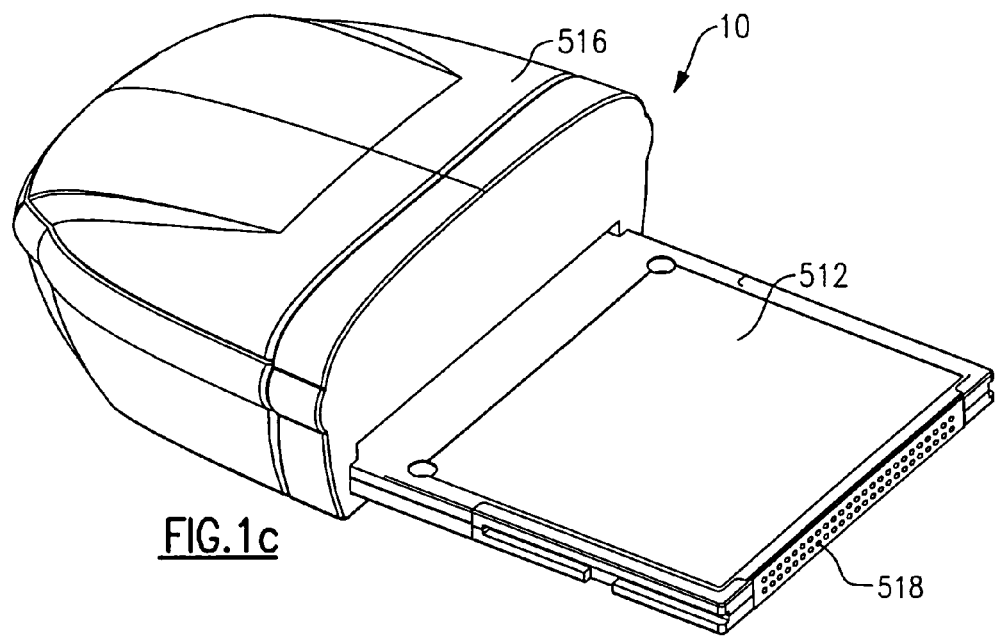
FIG.1c
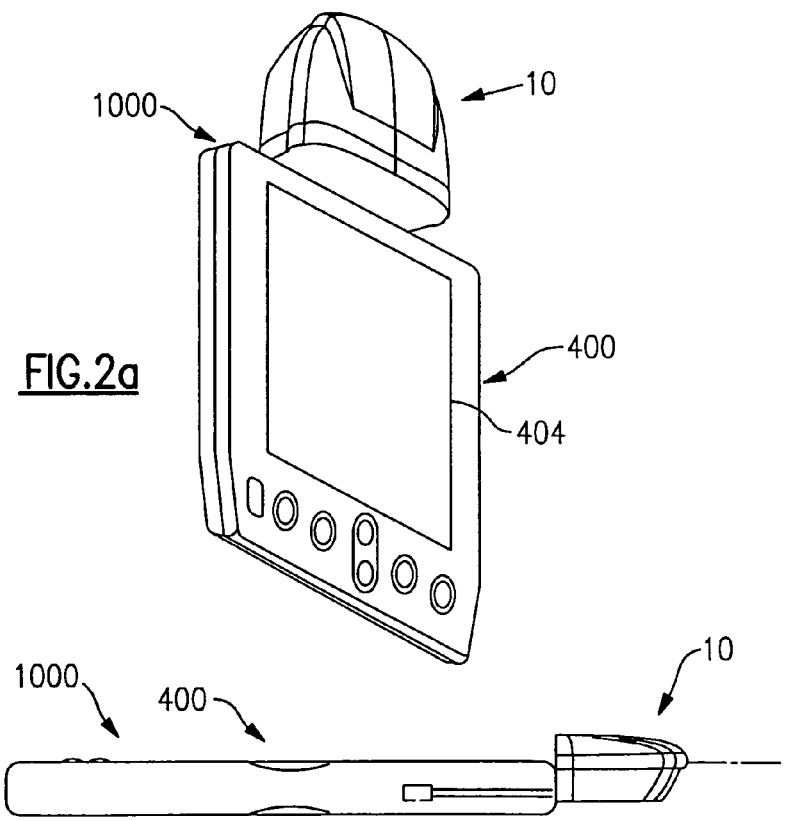
FIG.2a
FIG.2b

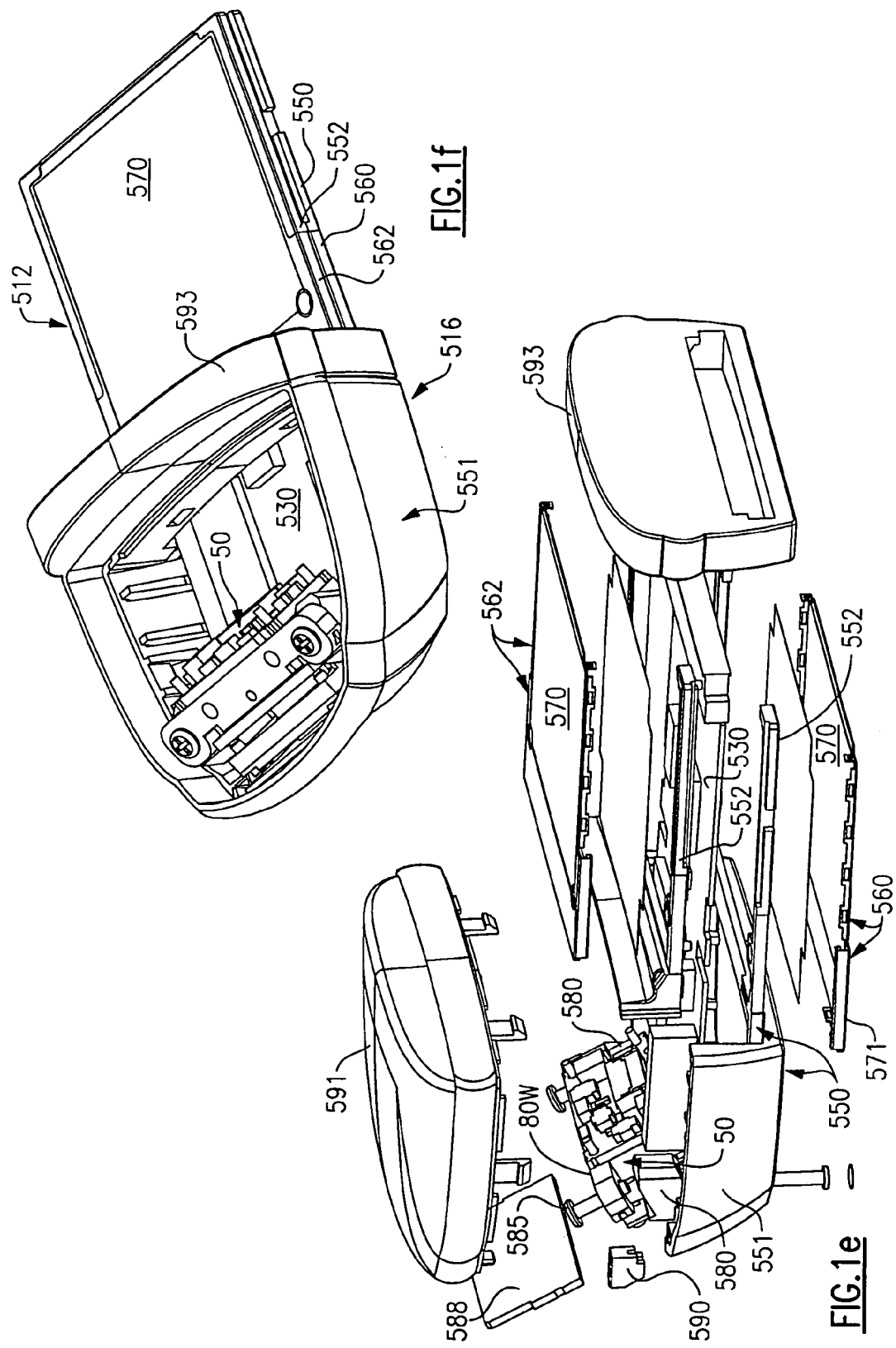

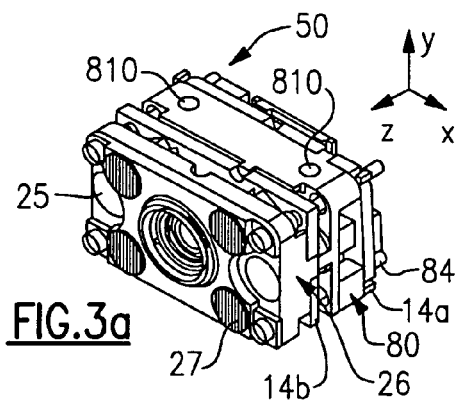
FIG.3a
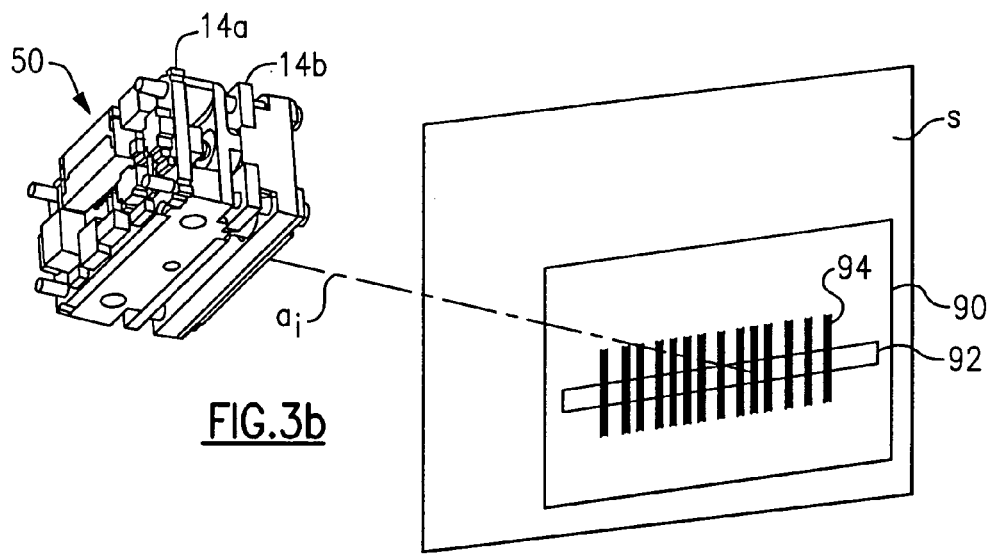
FIG.3b
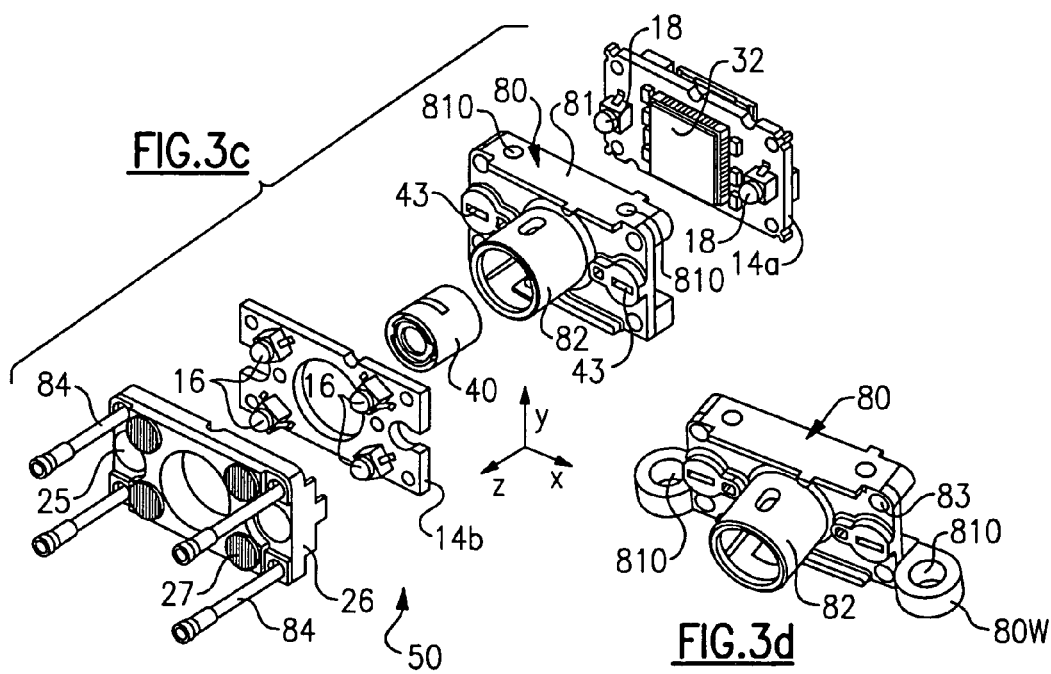
FIG.3c
FIG.3d

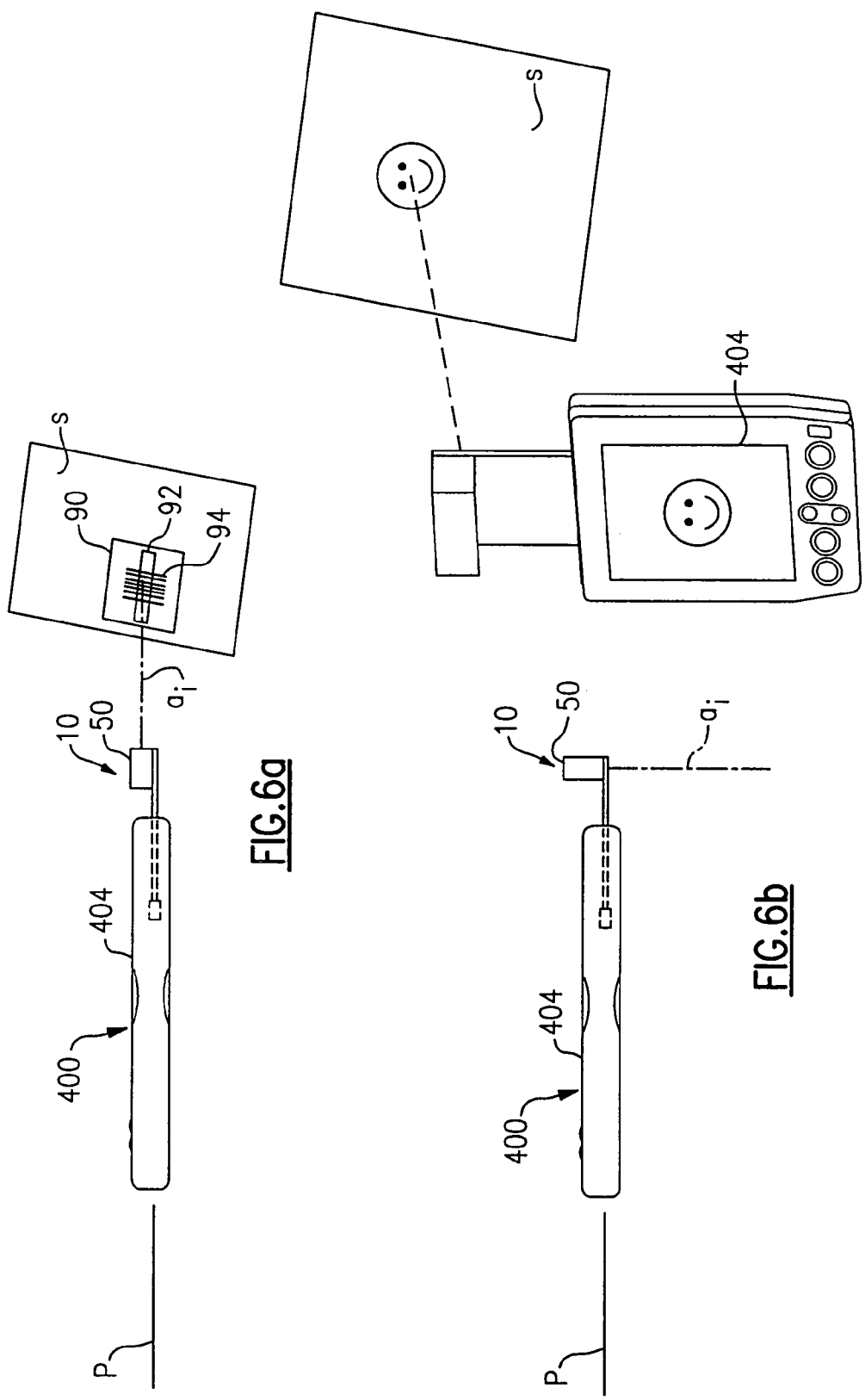

COMPUTER EXPANSION MODULE HAVING IMAGE CAPTURE AND DECODING FUNCTIONALITY

FIELD OF THE INVENTION

The invention relates to expansion modules in general and specifically to a computer expansion module having image capture and bar code decoding functionality.

BACKGROUND OF THE INVENTION

Computer expansion modules are available in a variety of form factors.

One example of a prior art expansion module is described in U.S. Pat. No. 5,808,672. U.S. Pat. No. 5,808,672 describes a PCMCIA type computer expansion module incorporating a rotatable camera head. The rotatable camera head can be rotated in either the vertical direction or the horizontal direction. The expansion module is adopted so that the camera head can be aimed generally in the direction of a user when the expansion module is plugged into a side expansion slot of a notebook computer.

Another example of a prior art expansion module is described in U.S. Pat. No. 6,292,272. In U.S. Pat. No. 6,292,272 an expansion module is described having a camera head pivotable between a first position wherein the imaging axis of the camera points upward and a second position wherein the imaging axis of the camera extend laterally with respect to the expansion module.

U.S. Pat. No. 6,118,485 describes a card type camera connected to an external host computer having an associated memory which is configured to access data stored in the associated memory of the host computer.

There is a need to add greater functionality to existing expansion modules as are represented by the above references.

SUMMARY OF THE INVENTION

According to its major aspects and broadly stated the invention is a computer expansion module (card) comprising an electrical circuit partially disposed on a printed circuit board having an imaging module including a camera and a bar code decoding circuit. The electrical circuit is adapted to capture images and to decode decodable indicia represented in captured images. When operating according to a picture taking mode, the electrical circuit captures an image without subjecting the image to a decode attempt. Also disposed on the printed circuit board of the card is a connector such as CompactFlash host connector which is detachably detachable with a complementary formed connector of a host computer. The imaging module of the expansion module includes an area image sensor and short range optics focusing images onto the area image sensor such that the expansion module includes a best focus receive distance of less than two feet.

In use, the expansion module is interfaced with a host computer such as a PDA having an expansion slot. The combination of the expansion module and the host computer forms an image capturing and decoding computer assembly. The computer assembly is programmed to operate in at least one of two user selectable operating modes. In a first "picture taking" operating mode actuated by user input into the host, the expansion module captures an image, and, without launching a decoding algorithm, transmits the image over the detachable connector coupling to the host where it is displayed on display integrated on the host. In a second "decode" operating mode, the expansion module captures an image, decodes a decodable indicia in the image and transmits a decoded out message to the host computer, which in turn displays the decoded message on a display of the host device.

BRIEF DESCRIPTION OF THE DRAWINGS

For a further understanding of these and objects of the invention, reference will be made to the following detailed description of the invention which is to be read in connection with the accompanying drawing, wherein:

FIGS. 1*a*-1*c* are outer skin perspective views of an expansion module according to the invention;

FIGS. 1*d*-1*f* are internal perspective construction views of an expansion module according to the invention;

FIGS. 2*a*-2*d* are alternative views of a computer assembly according to the invention including a personal data assistant (PDA) and an image capturing and decoding imaging module;

FIGS. 3*a*-3*d* are perspective views of an exemplary imaging module which may be incorporated in an expansion module according to the invention;

FIG. 6*a* is an application view of an expansion module having an imaging module mounting angle of 0 degrees relative to a plane of a planar insert section of the expansion module;

FIG. 6*b* is an application view of an expansion module having an imaging module mounting angle of −90 degrees relative to a plane of a planar insert section of the expansion module.

DETAILED DESCRIPTION OF THE INVENTION

Figure 1A:
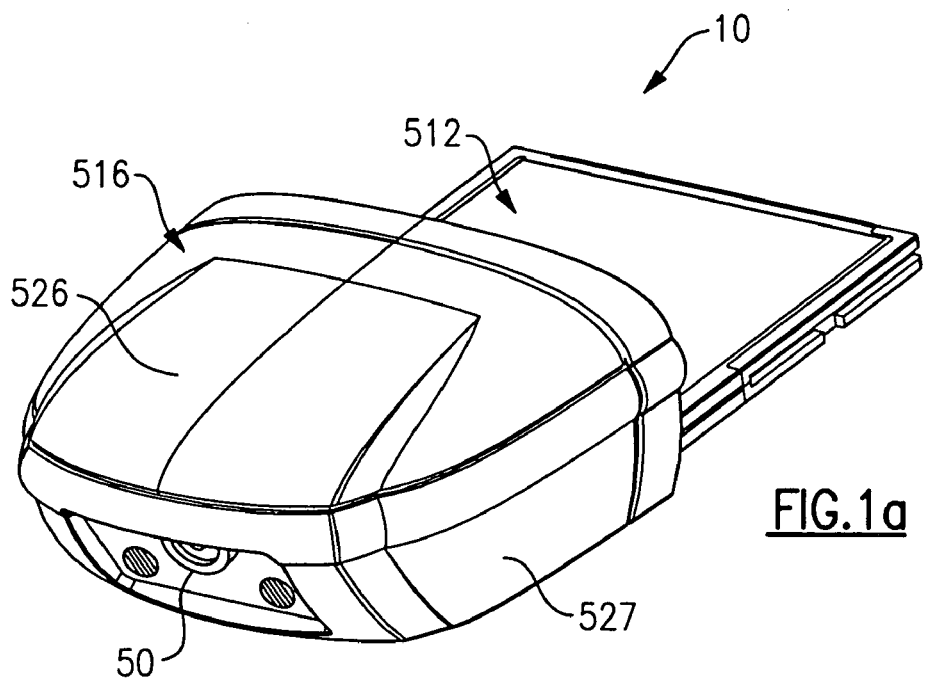
Figure 1B:
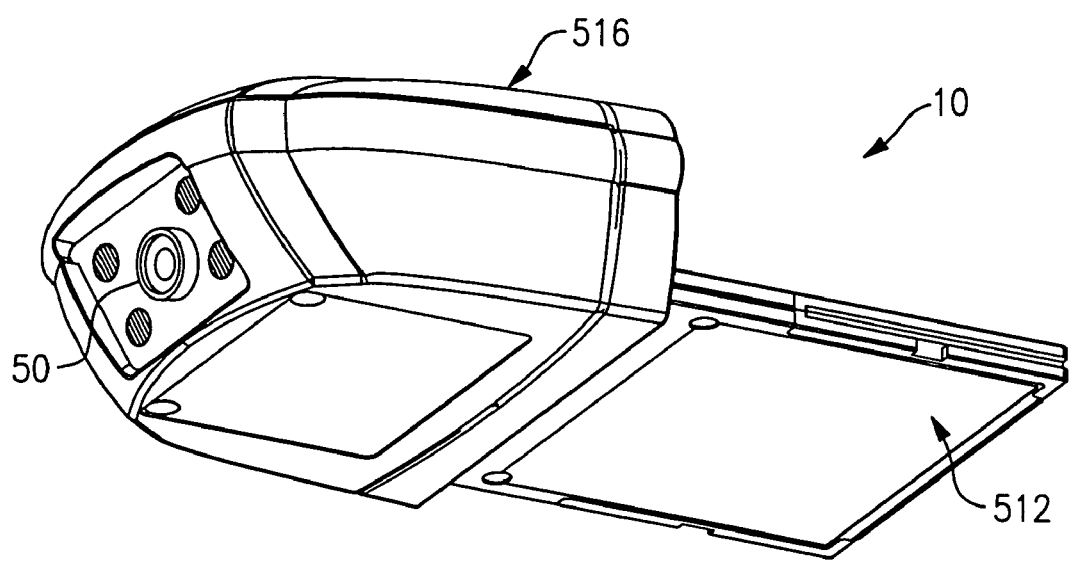

Perspective external skin views of an image capturing and decoding expansion module (card) are shown in FIGS. 1*a*, 1*b*, and 1*c*. Expansion module or card 10 includes planar insert portion 512 and a camera housing portion 516 incorporating imaging module 50. As will be explained in greater detail herein a printed circuit board carrying various electrical circuit components is partially disposed within both planar insert portion 512 and camera housing portion. At a distal end of planar insert portion 512 a host connector 518 is disposed. In one embodiment, module 10 and connector 518 are compatible with the Compact Flash standard as is described by the Compact Flash Specification, Version 1.4.

In use, picture taking and decoding expansion module 10 is detachably attached to a host computer such as a PDA as shown in FIG. 2*a*. When expansion module 10 is attached to a host 400, planar insert portion 512 is received in an interior of host 400. Host loadable software associated with expansion module 10 may be loaded into host 400 so that the computer assembly 1000 comprising host 400 and expansion module 110 is operable in at least two modes of operation.

Figure 4A:
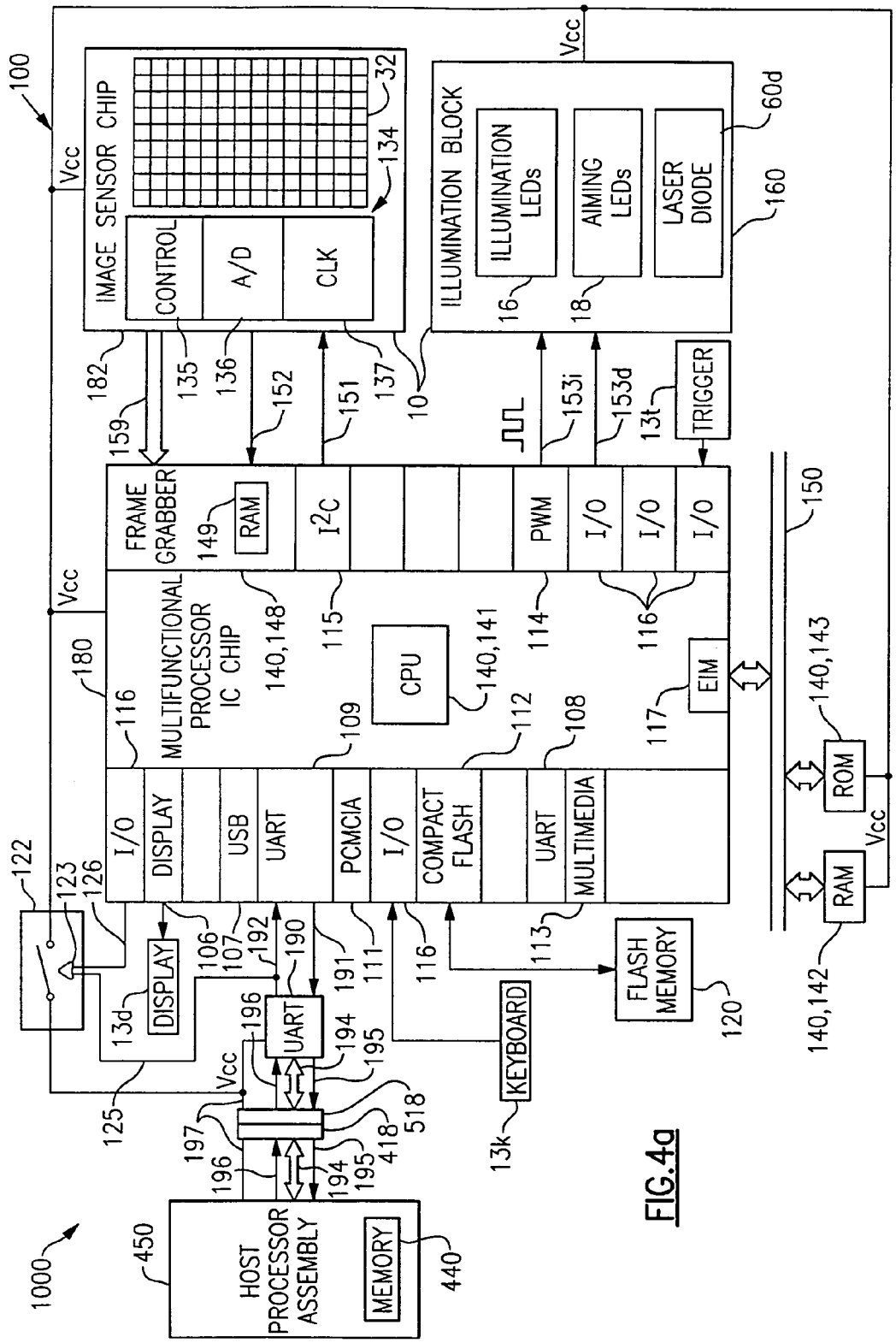
FIG. 4*a* is a block diagram of an electrical circuit for an expansion module according to the invention in association with a host processor assembly.

In a first "picture taking" mode of operation a user actuatable command to capture an image is input to host 400. In response to the command, host 400 transmits a picture taking instruction to expansion module 10. The instruction may comprise e.g. a 1 bit signal, a program instruction, or a string of program instructions. Expansion module 10, in response to receipt of the picture taking instruction captures an image, and without launching a decoding algorithm, sends the image to host 400. Host 400 in turn automatically displays the captured image on integrated display 404 of host 400. As part of the picture taking mode, host 400 may store the captured and transmitted image in a memory 440 of host 400, as is depicted in FIG. 4*a*.

In a second "decode" mode of operation, a user inputs into host 400 a command to decode a decodable indicia and host, in turn, sends a decode instruction to expansion module 10. In response to receipt of the decode instruction, expansion module 10 captures an image, subjects the image to a decode attempt, and sends a decoded-out message to host 400. Host 400 then automatically displays the decoded-out message on display 404. As part of a decode mode host 400 may store the decoded-out message into a memory 440 of host 400, is depicted in FIG. 4*a*.

In a third "movie" mode of operation, a user inputs a command to host 400 to display a series of captured images on display 404, and host 400, in turn, sends a movie mode instruction to expansion module 10. In response to receipt of the movie mode instruction, module captures a series of images and sends the images to host 400, which automatically displays on display 404 each frame of image data it receives from expansion module 10. The series of images displayed on display 404 can be referred to a streaming video image. Expansion module 10 may compress each captured image captured during the movie mode to improve the data rate of image data transmissions between module 10 and host 400.

Figure 2C:
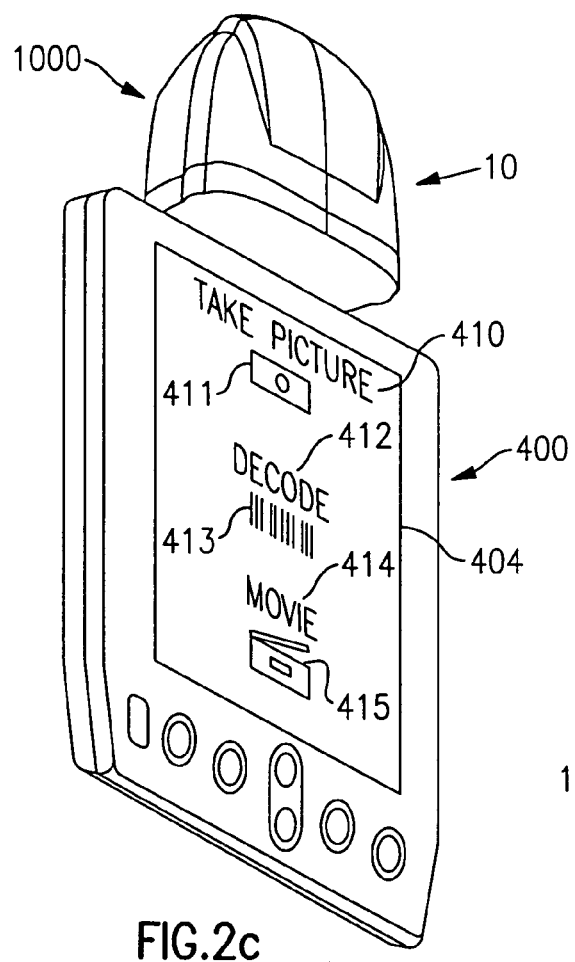
Figure 2D:
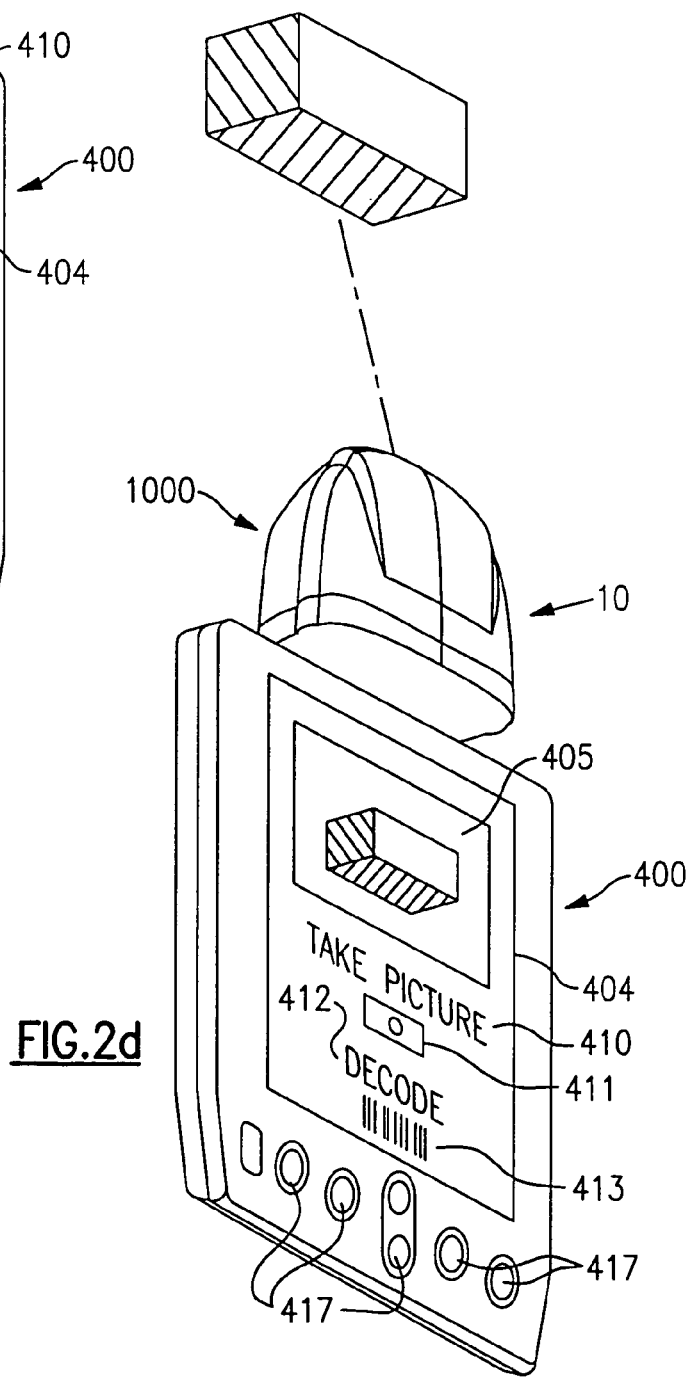

The various modes of operation of computer assembly 1000 can be actuated by user input into a displayed menu displayed on touch screen 404 of host 400. In the example of FIG. 2*c*, host computer 400, provided by a PDA, displays three menu options on touch screen 404. A "picture taking" mode is actuated by touch selection of message 400 or icon 411 control buttons corresponding to the picture taking mode. A "decode mode" is actuated by touch input of message 412 or icon 413 control buttons corresponding to the decode mode. A "movie" mode of operation is actuated by touch selection of message 414 or icon 415 control buttons corresponding to the movie mode. FIG. 2*d* illustrates computer assembly 1000 operating in a movie mode of operation. Displayed image 405 is a series of displayed images, otherwise referred to as a streaming video image. It is seen that computer assembly 1000 can be driven into a "picture taking" mode or a "decode" mode while operating in a movie mode. A "picture taking" mode can be actuated by touch selection of message 410 or icon 411 displayed during operation of assembly 1000 in a movie mode, while a "decode" mode can be actuated by touch selection of message 412 or icon 413 displayed during operation of assembly 1000 in a movie mode. Importantly, computer assembly 1000 can be configured so that each of the modes of operation of assembly 1000 can be actuated with a single actuation of a control button, e.g. control button 410, 411, 412, 413, 414, 415. That is a single actuation of button 412, for example, in one embodiment, causes a decoded out message to be displayed on display 404, and possibly a storing of the decoded out message into memory 440. A single actuation of button 411, in an exemplary embodiment, causes a display of a captured and transmitted image on display 404, and possibly a storage of a frame of image data into memory 440. In place of or as a supplement to control buttons 410-415, the various modes of operation of the invention can be actuated with use of control buttons 417.

Aspects of an exemplary imaging module 50 which may be incorporated in expansion module 10 are described with reference to FIGS. 3*a*-3*d*. Imaging module 50 may be an IT 4000 imaging module (patents pending) of the type available from Hand Held Products, Inc. of Skaneateles Falls, N.Y. IT4000 imaging modules available from Hand Held Products, Inc. are available with associated decode circuits which may be actuated to decode a decodable indicia, such as bar code indicia, within a captured image. Imaging module 50 can be an IT4200 imaging module with an associated decode-out circuit, also available from Hand Held Products, Inc. Imaging module 50 includes a support 80 having a containment 81 containing image sensor 32 incorporated on chip 182, and a retainer section 82 retaining a lens assembly 40 provided by a lens barrel. Lens assembly 40 includes a lens or lenses which focus images from a substrate s (as seen in FIG. 3*b*) onto image sensor 32. Preferably, lens assembly 40 is adapted so that a best focus receive distance for imaging module 50 is less than two feet (e.g. 3 inches, 5 inches, 7 inches). Configuring lens assembly 40 so that module 50 has a best focus receive distance of less than two feet allows module 50 to capture high resolution images at short range, from which decodable indicia can readily be decoded. Module 50, can also include an adjustable lens assembly for providing an adjustable best focus receive distance. A first circuit board 14*a* carrying image sensor chip 182 and aiming LEDs 18 is mounted to a back end of support 80 while a front circuit board 14*b* carrying illumination LEDs 16 is mounted to a front end of support 80. An optical plate 26 carrying aiming and illumination optics is disposed forward of second circuit board 14b. Supporting the various component of imaging module 50 are a plurality of conductive support posts 84. As shown in FIG. 3*d* support 80 can include integrated mounting wings 80*w* aiding in the mounting of module 50 within module 10. Imaging module 50 is fully assembled into a form substantially shown in FIGS. 3*a* and 3*b* prior to being installed in expansion module 10.

Referring to FIG. 3*b*, illumination LEDs together with illumination optics, project an illumination pattern 90 onto a substrate s. Illumination pattern 90 at normal working distances substantially corresponds to a field of view of imaging module 50. Aiming LEDs 18 together with aiming optics 43, 25 project an aiming pattern 92 onto a substrate s. Aiming pattern 92 aids in the alignment of imaging module 50 relative to a target. If expansion module 10 is moved so that aiming pattern 92 is located on a target indicia 94 such as the bar code shown in FIG. 3*b*, there is strong assurance that target indicia 94 is within a field of view of imaging module 50.

Figure 1D:
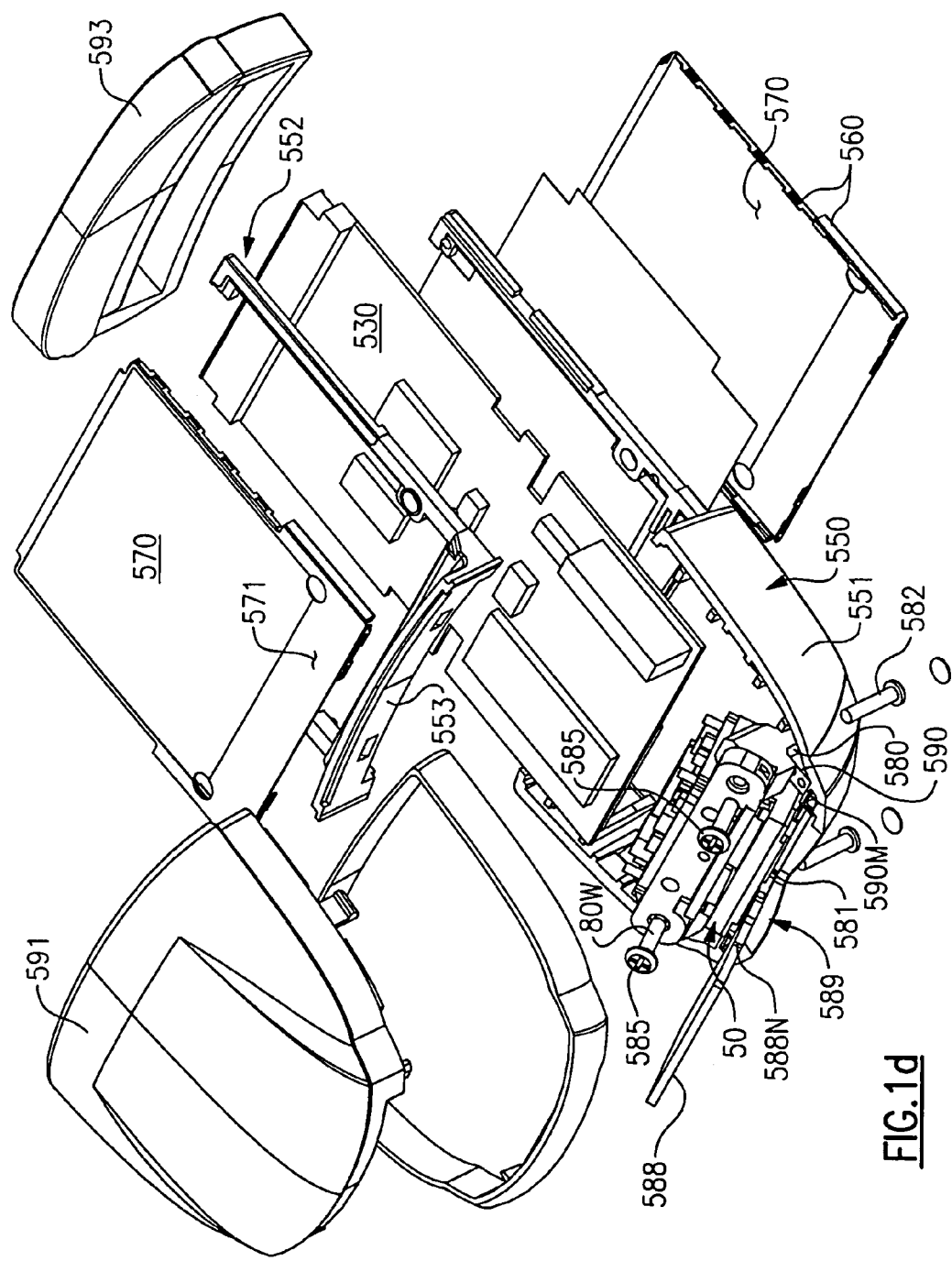

Further mechanical features of expansion module 10 are discussed in relation to FIGS. 1*d*, 1*e*, and 1*f*. As has been mentioned, printed circuit board 530 is partially disposed in a camera housing portion 516 of module 10 and partially disposed in an interior of planar insert portion 512 of module 10.

More specifically, module 10 includes a bottom chassis 550 and a top chassis 552. Printed circuit board 530 is held between the two chassis 550 and 552. Bottom chassis 550 includes integrated camera housing nose 551 while top chassis 552 includes forward wall 553 which provides containment of imaging module 50. Each of the bottom chassis and top chassis is supported by a planar frame. Bottom planar frame 560 supports bottom chassis 550 and top planar frame 562 supports top chassis 552. Each of the bottom and top planar frame includes a thin metal insert 570 section and a holder section 571. The metal insert section 570 of each of the top and bottom frames 560 and 562 is molded into its respective holder. Thin metal inserts 570 provide significant structural strength with minimal height consumption. Thin metal inserts 570 also provide electromagnetic shielding. As best seen in FIG. 1f the combination of top planar frame 562, top chassis 552, bottom chassis 550, and bottom planar frame 560 define a mechanical guide edge for receipt by a complementary formed slot wall of host 400 that is in accordance with the CompactFlash standard.

Referring to further aspects of expansion module 10, imaging module 50 of expansion module 10 is supported on posts 580 received on floor 581 of bottom chassis 550. Posts 580, may be secured by post screws 582. Imaging module 50 in the embodiment of FIGS. 1d-1f includes mounting wings 80w. For securing imaging module 50 to posts 580, screws 585 are driven through aligned screw holes of mounting wings 80w and posts 580. Imaging module 50 is preassembled as a fully assembled self-contained unit prior to being mounted on posts 580. Referring to further aspects of module 10, window 588 is received in a window recess 589 formed in nose 551, and is held in place with use of brackets 590. Specifically, when window 588 is disposed in recess 589, bracket 590 is screwed to or otherwise secured to chassis 550 in such a manner that member 590M of bracket 590 engages notch 588N of window 588 to hold window 588 in a secure position. When imaging module 50 and window 588 are installed, housing hood 591 is snap fit onto housing nose 551. Gasket 593, preferably comprised of resilient material, which aids properly spacing expansion module 10 and host 400 is then slid over planer insert portion 512 and abutted against the assembled camera housing portion 516 of module 10.

Printed circuit board 530 carries several of the components of electrical circuit 100, including host connector 518, to be described with reference to FIG. 4a. Host connector 518 is attached to a distal end of printed circuit board 530 in a manner that in compliance with the previously referenced CompactFlash standard. Imaging module 50 can be in communication with printed circuit board 530 via a flex cable (not shown).

An electrical circuit 100 for expansion module 10 is described with reference to FIG. 4a. Electrical circuit 100 includes many features incorporated in a commercially available decode out circuit (patents pending) associated with the previously referenced IT4000 imaging module available from Hand Held Products, Inc. of Skaneateles Falls, N.Y.

In the specific embodiment of FIG. 4a, electrical circuit 100 includes a control circuit 140 comprising CPU 141, system RAM 142 and system ROM 143 and frame grabber block 148. Electrical circuit 100 further includes an image sensor 32 typically provided by a photosensitive array and an illumination block 160 having illumination LEDs 16 and aiming LEDs 18 as shown in the physical form view of FIGS. 3a-3c. Image sensor 32 of FIG. 4a is shown as being provided by a 2D photo diode array. If image sensor 32 is replaced by a 1D image sensor, then aiming LEDs 18 and illumination LEDs 16 may be constituted by one set of LEDs. In the embodiment shown, image sensor 32 incorporated in an image sensor IC chip 182 which typically further includes an image sensor electrical circuit block 134. Image sensor electrical block 134 includes control circuit 135 for controlling image sensor 32, an A/D conversion circuit 136, for converting analog signals received from image sensor 32 into digital form and integrated clock 137 sometimes referred to as an oscillator.

In the embodiment shown in FIG. 4a, CPU 141 and frame grabber block 148 are incorporated in a multi-functional IC chip 180 which in addition to including CPU 141 includes numerous other integrated hardware components. Namely, multi-functional IC chip 180 may include a display control block 106, several general purpose I/O ports 116, several interface blocks such as a USB circuit block 107 and a UART block 108 for facilitating RS 232 communications, a UART block 109 for facilitating Irda communications, and a pulse width modulation (PWM) output block 110. Multi-functional processor IC chip 180 can also have other interfaces such as a PCMCIA interface 111, a compact flash interface 112, and a multimedia interface 113. If expansion module 10 includes a display 13d, display 13d may be in communication with chip 180 via display interface 106. Module 10 can further include a trigger 13t and keyboard 13k. Display 13d, trigger 13t and keyboard 13k can be incorporated in surfaces 526 and 527 of camera housing portion 516 of expansion module 10 (see FIG. 1a). Trigger 13t and keyboard 13k may be in communication with chip 180 via general purpose I/O interface 116. Multi-functional processor IC chip 180 may be one of an available type of multi-functional IC processor chips which are presently available such as a Dragonball IC processor chip available from Motorola, an Anaconda IC processor chip available from Motorola, a DSC IC chip of the type available from Texas Instruments, an O-Map IC chip also of the type available from Texas Instruments or a multi-functional IC processor chip of a variety available from Clarity, Inc.

Frame grabber block 148 is a specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements. Programming options for programming frame grabber block 148 include options enabling block 148 to be customized to facilitate frame capture that varies in accordance with image sensor characteristics such as image sensor resolution, clockout rating, and fabrication technology (e.g. CCD, CMOS, CID), dimension (1D or 2D) and color (monochrome or color).

Aspects of the operation of circuit 100 when circuit 100 captures image data into RAM 140 are now described. When trigger 13t is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., I²C interface 115 of chip 180 is utilized to facilitate communication with chip 182 (if another image sensor chip is selected another type of interface e.g. interface 116 may be utilized). Other types of signals may be sent over line 151 during the course of image capture. Line 151 may carry, for example, timing initialization, gain setting, and exposure setting signals.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148 "start of frame signals" which inform frame grabber block 148 that chip 182 is ready to transmit a new frame of image data, "data valid window" signals which indicate periods in which a row of image data is valid and "data acquisition clock" signals as established by clock 137 controlling the timing of image data capture operations. In the embodiment described, line 152 represents three physical communication lines, each carrying one of the above types of signals. In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g about 0.1 to 0.8) or a full line of image data.

Referring to further aspects of electrical circuit 100, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long term storage devices. Electrical circuit 100 can include for example a "flash" memory device 120. Several standardized formats are available for such flash memory devices including: "Multimedia" (MMC), "Smart Media," "CompactFlash," and "Memory Stick." Flash memory devices are conveniently available in card structures which can be interfaced to CPU 141 via an appropriate "slot" electromechanical interface in communication with IC chip 180. Flash memory devices are particularly useful when reader 5 must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning off and turning on of LEDs 16, 18 of illumination block 160. Control circuit 140 preferably controls illumination block 160 in a manner that is coordinated with the capturing of the frames of image data. Illumination LEDs 16 are typically on during at least a portion of frame capture periods. Configuring circuit 140 so that LEDs 16, 18 have off periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned on at a leading edge of PWM pulses output at PWM interface 114, and are turned off at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned on and off several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multi-functional IC chip 180 including frame grabber block 148 and PWM output 114 greatly simplifies the task of developing PWM signals for use in controlling illumination LEDs 16 of module 10.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

In a further aspect of electrical circuit 100, aiming LEDs 18 of circuit 100 can be controlled by a signal transmitted by a general purpose I/O port 116 of IC chip 180 over communication line 153a. Multi-functional processor IC chip 180 can be programmed so that an aiming LED control signal controlling LEDs 18 is in an ON state when pixels of image sensor 32 are not being exposed to light. Such control of image sensor 32 alleviates any affect which light from aiming LEDs 18 would otherwise have on an image signal generated by image sensor 32. If it is desired to selectively turn ON LEDs 18 intermediate of exposure periods, image sensor 32 should be selected to be of a type wherein all rows of image sensor 32 are exposed simultaneously, or else should be controlled so that periods exist wherein no row of image sensor 32 is exposed to light.

In a further aspect of electrical circuit 100, electrical circuit 100 includes a Universal Asynchronous Receive Transmit (UART) 190 in electrical communication with UART interface 109 of processor IC chip 180 and connector 518. UART 190 may be provided, for example, by an ASIC, an FPGA, or another programmable logic device. UART 190 may be programmed to (1) communicate with host 400 to inform host 400 that expansion module 10 is connected to host 400, (2) perform all CompactFlash bus timing (e.g. protocol, waveforms as defined by the CompactFlash Specification 1.4), and (3) to provide all buffer interfaces required to receive from circuit 100 data in a format supported by electrical circuit 100 (e.g. TTL 232) and to allow that data to be received in a CompactFlash format as is required by host processor assembly 450 of host computer 400. UART 109 can be substituted for by another type of CompactFlash-to-serial communication interface driver (e.g. a USB controller, an I²C controller, an ethernet controller, an SPI controller). UART 190 can also be substituted for by a CompactFlash-to-parallel interface driver.

Communication line 191 between processor IC chip 180 and UART 190 represents a plurality lines such as transmit, request-to-send (RTS), and data set ready (DSR). Communication line 192 between UART 190 and IC chip 180 represents a plurality of lines such as receive, request-to-send (RTS) and data terminal ready (DTR). Data lines 194 between UART 190 and connector 518 and between connector 418 and host processor assembly 450 represent bidirectional data lines and address lines. Communication line 195 between UART 190 and connector 518 and between connector 418 and host processor assembly 45 represent such lines as a ready/busy line, an interrupt request line, and a card detect line (which is automatically sent by module 10 when module 10 is attached to host 400). Communication line 196 between host processor assembly 450 and connector 418 and between connector 518 and UART 190 represent such lines as chip select lines, read/write lines. Line 197 represents a shared power source line between host 450 and expansion module 10. A shared ground between host processor assembly 450 and expansion module 1D is not shown.

In another aspect of electrical circuit 100, electrical circuit 100 includes a redundant sleep control system which is controlled redundantly both by a signal generated by host processor assembly 450 of host 400 and by a signal generated by control circuit 140.

Still referring to FIG. 4a, common power line 197 between host processor assembly 450 and expansion module 10 is interfaced to switch 122. When switch 122 is in a closed contact state (with host connector 518 of module 10 attached to device connector 418 of host 400) power is delivered to the various components of expansion module 10 including IC chip 180, chip 142, chip 143, and imaging module 50 including chip 182. When switch 122 is in an open contact state, power to the various components of expansion module 10 including IC chip 180, chip 182, chip 142, and chip 143 is cut off. It is advantageous to power the components of module 10 down whenever possible to reduce the overall power consumption of module 10. It is seen that electrical circuit 100 is configured so that UART 190 is always powered whenever module 10 is attached to host 400.

Electrical circuit 100 is configured so that switch 122 is driven into a closed contact state in one of two ways. OR gate 123 representing the logic control of switch 122, has two inputs, namely line 125 and line 126. Line input 125 to OR gate 123 monitors the state of data terminal ready (DTR) signal carried by a line represented by line 192. The state of a data terminal ready signal carried by line 192 is controlled by host processor assembly 400. Line input 126 to OR gate 123, meanwhile, carries a "power hold" signal having a state controlled by expansion module control circuit 141.

In general, it is normally desirous to configure host processor assembly 400 so that host processor assembly 400 drives a DTR signal high whenever (1) host processor assembly is capable of sending instructions and/or data to attached device 10, or (2) host processor assembly 400 is capable of receiving data from an attached device such as device 10.

Host processor assembly 400 can control the state of a DTR signal in a number of different ways. Host processor assembly 400 can include a standard RS232 comport driver, in which case the state of DTR signal is controlled by instructions of an application program running on host processor assembly 400. Host processor assembly 400 can also include a custom hardware comport driver which is knowledgeable of power and control protocols specific to the device 100 attached to host processor assembly 400.

It may be advantageous to make expansion module 10 available to a customer with a host loadable software development kit. The software development kit allows a user to customize an operating program for host 400. The software development kit, in one embodiment, allows a user-customer to make a program which results in a predetermined set of script instructions being transmitted to expansion module 10. Script instructions are types of high level instructions which can be executed by an interpreter program on expansion module 10, without first having to be compiled by a compiler established either on host 400 or expansion module 10.

The inventors discovered the problem that host processor assembly 400 may fail to appropriately control the signal state of the DTR signal under a variety of different operational scenarios. In the case that host processor assembly 400 includes a standard RS232 comport driver, a programmer of host processor assembly 400, who may be a programmer with minimal programming experience, may fail to develop a program which appropriately controls the signal state of the DTR signal or other signal indicative of the capacity of host 400 to send or receive instructions and or data. While an optimally designed custom hardware comport driver controlling the signal state of a DTR signal in theory would alleviate the problem of erroneous DTR signal state control, development of a custom hardware comport driver requires substantial engineering cost expenditures and an intimate familiarity of the operating system established in host 400. Further, it is possible that with use of a software development kit, allowing customization of an operating program of host processor assembly 400, a programmer could create code overriding the proper functioning of a custom hardware comport driver.

Accordingly, electrical circuit 100 is configured so that a signal generated by control circuit 100 in direct communication with switch 122 controls the state of switch 122. By the term "in direct communication with switch" it is meant that the "power hold signal" determines the state of switch 122 without any intervening reading or recognition of the power hold signal by host 400. Specifically, control circuit 140 is programmed so that power hold signal on line 126 is driven high whenever control circuit 140 is capturing images, subjecting captured image to a decode attempt, or transmitting either of a captured image or a decoded out message to host 400. Control circuit 140 is further programmed so that the power hold signal is driven low when control circuit 140 completes a processing task. For example, in the picture taking mode described above, control circuit 140 may drive a power hold signal low when control circuit 140 transmits a last bit of a data corresponding to a frame of transmitted image data to host 400. When operating in decode mode, control circuit 140 may drive a power hold signal low when control circuit 140 competes the task of transmitting a decoded out message to host 400. In a specific example of electrical circuit 100, both switch 122 and multi-functional processor IC chip 180 are IC chip components carried by printed circuit board 530, and the power hold signal is carried by a single PCB line 12b tracing between a general purpose I/O port of chip 182 and switch 122. In one exemplary alternative embodiment, switch 122 could be incorporated in multi-functional processor IC chip 180.

While electrical circuit 100 includes a redundant sleep control system controlled either by a DTR signal generated by host 400 or a "power hold signal" generated by expansion module 10 control circuit 140 it will be understood that the contact state of switch 122 can advantageously be controlled solely by the state of the power hold signal controlled by control circuit 140.

Figures 4B, 4C:
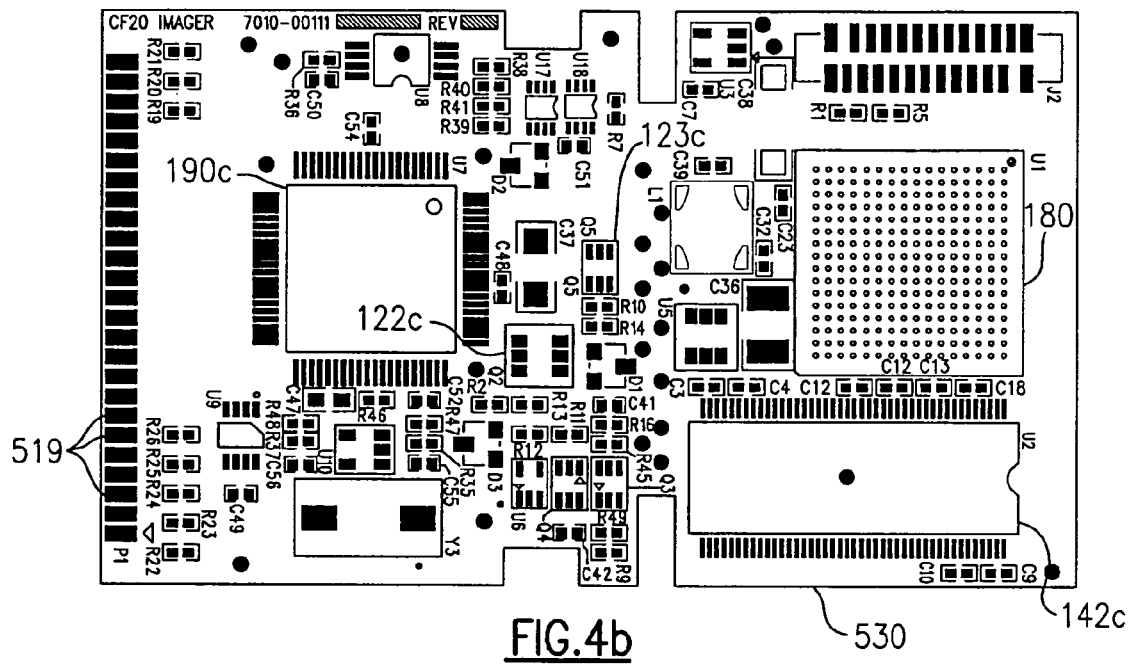
FIGS. 4*b* and 4*c* is an exemplary printed circuit board and chip layout diagram associated with the electrical circuit described with reference to FIG. 4*a*.

Referring to the chip layout diagrams of FIGS. 4b and 4c multi-functional processor IC chip 180 can be disposed on printed circuit board 530 toward forward end of circuit board 530, together with RAM chip 142c. ROM chip 143c can be disposed on under side 531 of board 530 toward forward end of board 530. UART 190, provided by ASIC chip 190c can be disposed toward a distal end of printed circuit board 530. Host connector 518 is soldered to contacts 519 at a distal edge of circuit board 530. Multi-functional processor IC chip 180 is in communication with chips making up switch 122 in accordance with the circuit diagram of FIG. 4a. Specifically, IKC chip 180 is in communication with transistor package chip 123c providing the function of OR Gate 123, which is in communication with switch contact chip 122c.

Figure 5A:
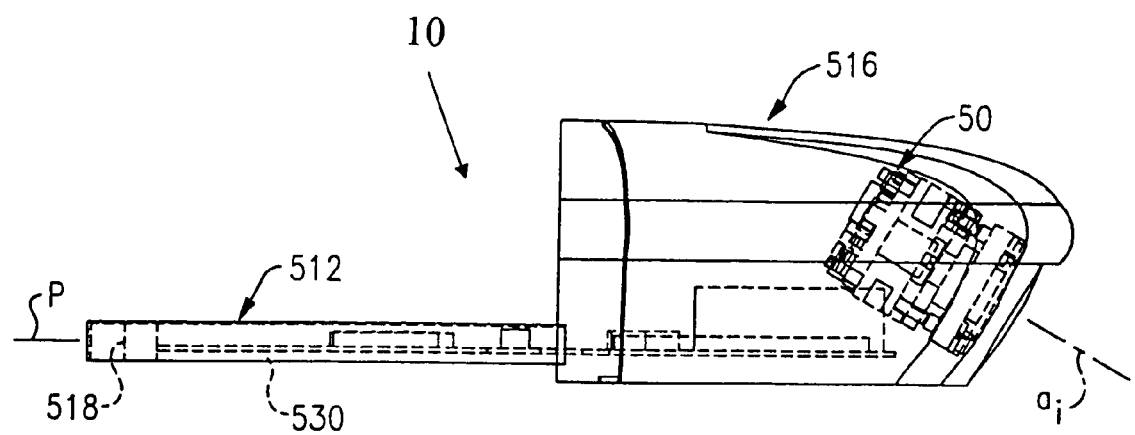
FIG. 5*a* is a side dashed-in internal view of an expansion module according to the invention.

Additional features of the invention are described with reference to FIG. 5a showing a dash-in internal side view of expansion module 10. As best seen in FIG. 5a imaging module 50 is fixedly mounted so that an imaging axis $a_i$ of imaging module 50 is at an angle of about −30 degrees relative to a plane, (P), of insert section 512. The fixed −30 degree mounting angle is one that well-adapts expansion module 10 for both picture taking and decoding. Mounting imaging module at 0 degrees as is illustrated diagramically in FIG. 6a optimizes expansion module 10 for purposes of enabling a user to easily locate projected aiming pattern 92 onto a target indicia 94 such as a decodable bar code symbol as seen in FIG. 3b.

The inventors found that for decoding applications, a field of view of module 50 is most easily aligned with a target by moving module 10 so that aiming pattern 92 coincides with the target (decodable indicia). The 0 degrees mounting angle as depicted in FIG. 6a optimized module 10 for decoding for the reason that aiming pattern 92 is most easily aligned with target indicia 94 when imaging axis $a_i$ on or about which pattern 92 is projected is coplanar with a plane (P) of plane insert section 512. The inventors also found that for picture taking applications, a field of view of module 50 is most easily aligned with a target object by actuating a "movie" mode, as described herein to generate a streaming video image on display 404 and by actuation a "picture taking" mode during execution of the movie mode when the streaming video image corresponds with a desired target object. As is depicted in FIG. 5b, a displayed steaming video image displayed on display 404 wherein imaging module 50 is mounted so that imaging axis $a_i$, is −90 degrees from a plane, (P), of planar insert section 512.

Figure 5B:
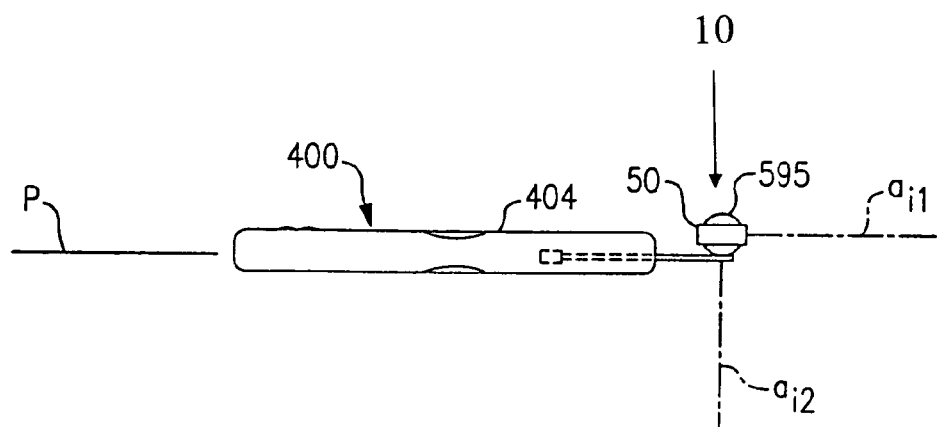
FIG. 5*b* is a side view of an alternative expansion module according to the invention.
Figure 7A:
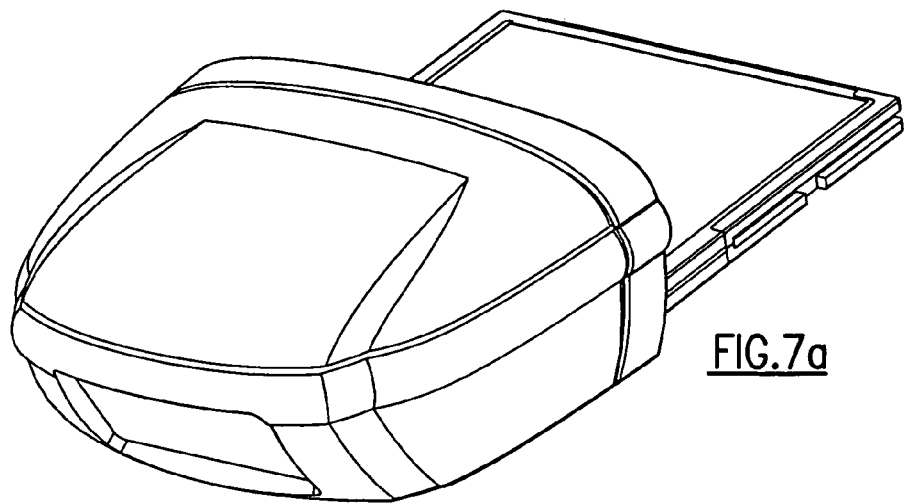
FIGS. 7*a*-7*g* are views of an expansion module illustrating an ornamental design thereof.
Figure 7B:
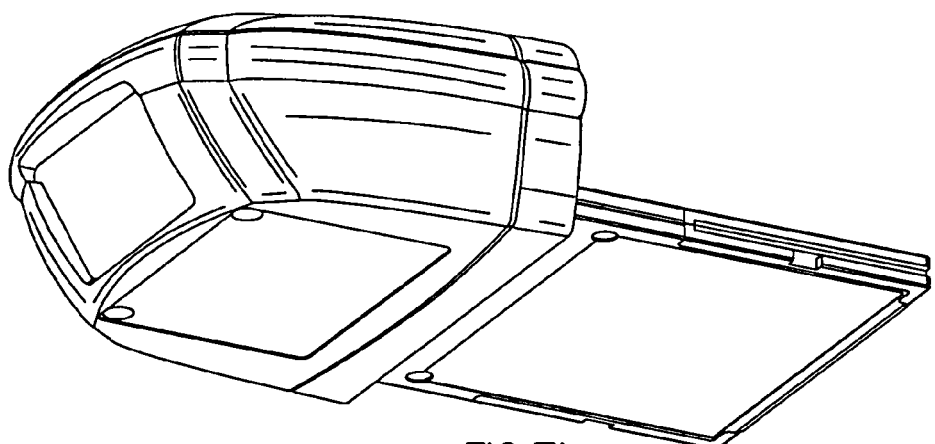
Figure 7C:
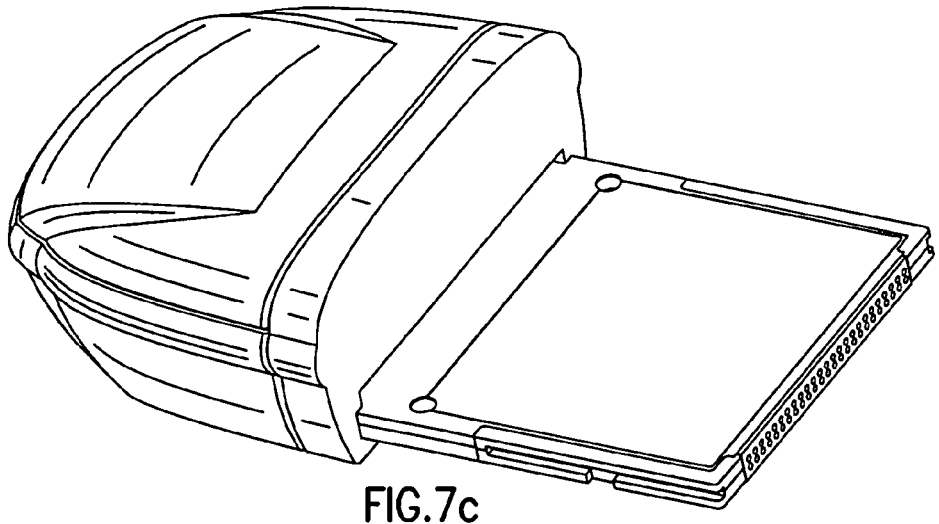
Figure 7D:
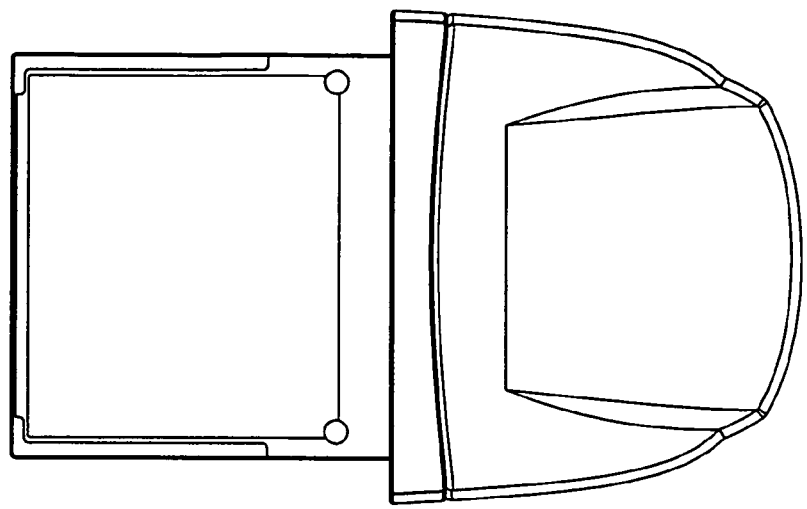
Figure 7E:
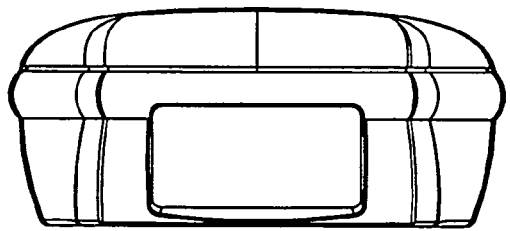
Figure 7F:
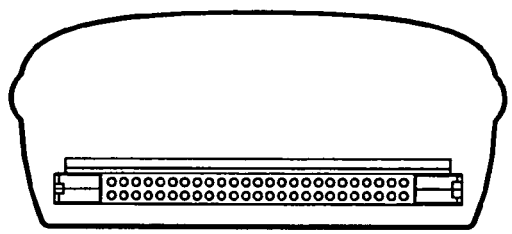
Figure 7G:
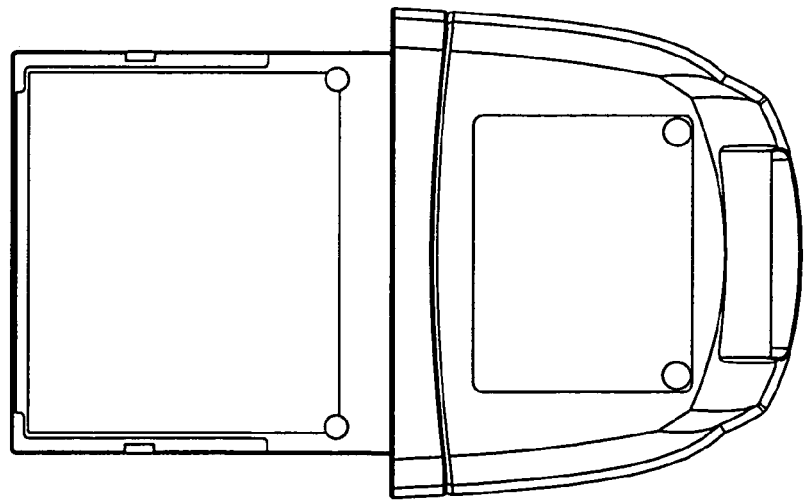

In the embodiment of FIG. 5b, expansion module 10 includes a motor driven rotary mount 595 on which imaging module 50 is supported. Control circuit 140 is in communication with mount 595 so that when a "decode" mode is actuated, module 50 is automatically moved in response to motor control electrical signals sent by control circuit 140 to rotary mount 595 so imaging axis $a_{i1}$ of module is at an angle of 0 degrees relative to plane P. When a "movie" mode is actuated as described previously module 50 is automatically moved in response to motor control electrical signals sent by control circuit 140 to rotary mount 595 so that imaging axis $a_{i2}$ of module 50 is at an angle of −90 degrees relative to plane P.

While the advantages of rotary mount 595 and alternative structures (moving mirrors, prisms, etc.) for moving axis $a_1$ are appreciated, rotary mount 595 adds cost to module 10 and reduces snappiness. Accordingly, the inventors developed fixed mounting angles for module 50, which would yield benefits described herein attributable to both of the 0 degree and the 90 degree mounting angles described herein. The inventors found that a fixed mounting angle of between about −20 degrees and about −70 degrees is a mounting angle that well-adapts expansion module 10 for both decoding (where an aiming pattern 92 is located on a target 94 for alignment module 50) and picture taking (where a user often observes a streaming video image of display screen 404 prior to commanding host computer 400 to commence a picture taking mode). Based on field data collected from prospective users, the inventors found that providing a fixed mounting angle of between about −20 degrees and about −70 degrees and in a specific embodiment between about −25 degrees and −35 degrees relative to plane, P, of insert section 512 allows both pattern 92 to readily be located on a target indicia 94 during a decode mode, and display 404 to be readily viewed during a "picture taking" mode.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:
1. A computer assembly comprising:
a host computer having an externally accessible device connector for receiving an expansion module;
an expansion module, said expansion module including:
a host connector configured to detachably attach to said device connector;
an imaging module including a 2D image sensor; and
a control circuit in communication with said imaging module, wherein said control circuit captures frames of image data corresponding to image signals generated by said 2D image sensor;
wherein said host computer includes a power source in electrical communication with said expansion module; and
wherein said expansion module includes a universal asynchronous receiver/transmitter (UART) integrated circuit (IC) and a sleep control system, said sleep control system comprising a switch coupled to said power source, said switch having closed contact state wherein power is supplied to all electrically powered components of said expansion module, and an open contact state wherein power is not supplied to said imaging module but is still supplied to said UART IC.
2. The computer assembly of claim 1, wherein said assembly is configured to operate in at least a first "picture taking" mode and second "decode" mode, wherein said control circuit in said picture taking mode captures a frame of image data and without attempting to decode any decodable indicia represented therein, transmits said frame to said host computer, and wherein said control circuit in said decode mode captures a frame of image data, executes a decoding algorithm to decode a decodable indicia representation therein, and transmits a decoded output message to said host computer.
3. The computer assembly of claim 1, wherein said assembly further comprises a planar insert section having a distal end and a shape defining a plane, said plane being defined as being oriented parallel to a largest flat surface of said shape of said planar insert section.
4. The computer assembly of claim 1, wherein said assembly further comprises a planar insert section having a distal end and a shape defining a plane, said plane being defined as being oriented parallel to a largest flat surface of said shape of said planar insert section; and
wherein said host connector is disposed at said distal end, said device connector and said host connector defining a connector coupling.
5. The computer assembly of claim 1, wherein said imaging module further comprises illumination LEDs.
6. The computer assembly of claim 1, wherein said computer assembly is configured to operate in a "picture taking" mode and a "movie" mode and wherein said computer assembly is configured so that said computer assembly can be driven into said picture taking mode when operating in said movie mode.
7. The computer assembly of claim 1, wherein said computer assembly is configured to operate in a "decode" mode and a "movie" mode and wherein said computer assembly is configured so that said computer assembly can be driven into said decode mode when operating in a movie mode.
8. The computer assembly of claim 1, wherein said expansion module includes a single 2D image sensor.
9. The computer assembly of claim 1, wherein said computer assembly is configured to operate in a "decode" mode and a "picture taking" mode, and wherein said imaging module further comprises an imaging axis;

wherein said assembly further comprises a planar insert section having a distal end and a shape defining a plane, said plane being defined as being oriented parallel to a largest flat surface of said shape of said planar insert section; and wherein said expansion module includes a rotary mount in communication with said control circuit, wherein said control circuit when in said decode mode causes automatic movement of said rotary mount so that said imaging axis is at an angle of 0 degrees relative to said plane, and wherein said control circuit when in said picture taking mode causes automatic movement of said rotary mount so that said imaging axis is at an angle of −90 degrees relative to said plane.

10. A computer assembly comprising:

a host computer having an externally accessible device connector for receiving an expansion module and a power source;

an expansion module, said expansion module including:

a host connector configured to detachably attach to said device connector;

an imaging module including a 2D image sensor;

a control circuit in communication with said imaging module, wherein said control circuit captures frames of image data corresponding to image signals generated by said 2D image sensor;

wherein said host computer includes a power source in electrical communication with said expansion module;

wherein said expansion module includes a sleep control system, said sleep control system comprising a switch coupled to said power source, said switch having closed contact state wherein power is supplied to all electrically powered components of said expansion module, and an open contact state wherein power is not supplied to said imaging module; and wherein said sleep control system is configured to be redundantly controlled by a signal generated by said host computer and by a signal generated by said control circuit.

11. The computer assembly of claim 10, wherein said assembly is configured to operate in at least a first "picture taking" mode and second "decode" mode, wherein said control circuit in said picture taking mode captures a frame of image data and without attempting to decode any decodable indicia represented therein, transmits said frame to said host computer, and wherein said control circuit in said decode mode captures a frame of image data, executes a decoding algorithm to decode a decodable indicia representation therein, and transmits a decoded output message to said host computer.

12. The computer assembly of claim 10, wherein said assembly further comprises a planar insert section having a distal end and a shape defining a plane, said plane being defined as being oriented parallel to a largest flat surface of said shape of said planar insert section.

13. The computer assembly of claim 10, wherein said assembly further comprises a planar insert section having a distal end and a shape defining a plane, said plane being defined as being oriented parallel to a largest flat surface of said shape of said planar insert section; and wherein said host connector is disposed at said distal end, said device connector and said host connector defining a connector coupling.

14. The computer assembly of claim 10, wherein said imaging module further comprises illumination LEDs.

15. The computer assembly of claim 10, wherein said computer assembly is configured to operate in a "picture taking" mode and a "movie" mode, and wherein said computer assembly is configured so that said computer assembly can be driven into said picture taking mode when operating in said movie mode.

16. The computer assembly of claim 10, wherein said computer assembly is configured to operate in a "decode" mode and a "movie" mode, and wherein said computer assembly is configured so that said computer assembly can be driven into said decode mode when operating in said movie mode.

17. The computer assembly of claim 10, wherein said expansion module includes a single 2D image sensor.

18. The computer assembly of claim 10, wherein said computer assembly is configured to operate in a "decode" mode and a "movie" mode, and wherein said imaging module further comprises an imaging axis;

wherein said assembly further comprises a planar insert section having a distal end and a shape defining a plane, said plane being defined as being oriented parallel to a largest flat surface of said shape of said planar insert section; and wherein said expansion module includes a rotary mount in communication with said control circuit, wherein said control circuit when in said decode mode causes automatic movement of said rotary mount so that said imaging axis is at an angle of 0 degrees relative to said plane, and wherein said control circuit when in said picture taking mode causes automatic movement of said rotary mount so that said imaging axis is at an angle of −90 degrees relative to said plane.

* * * * *